United States Patent [19]

Scata'

[11] Patent Number: 4,804,078
[45] Date of Patent: Feb. 14, 1989

[54] SORTING DEVICE FOR CONVEYOR BELT SYSTEMS

[75] Inventor: Mario Scata', Teramo, Italy

[73] Assignee: Meccanizzazione Postale E Automazione SpA (MPA), Teramo, Italy

[21] Appl. No.: 13,985

[22] PCT Filed: May 20, 1986

[86] PCT No.: PCT/EP86/00310
§ 371 Date: Feb. 2, 1987
§ 102(e) Date: Feb. 2, 1987

[87] PCT Pub. No.: WO86/07338
PCT Pub. Date: Dec. 18, 1986

[30] Foreign Application Priority Data

Jun. 13, 1985 [IT] Italy .................... 22178/85[U]

[51] Int. Cl.[4] .............................. B65G 47/00
[52] U.S. Cl. ................... 198/346.2; 198/360; 198/367; 198/463.3; 209/655; 209/924
[58] Field of Search .................. 198/360, 372, 346.2, 198/463.3, 568, 367, 442; 209/655, 924; 53/244, 202

[56] References Cited

U.S. PATENT DOCUMENTS

| | | | |
|---|---|---|---|
| 2,868,245 | 1/1959 | Ernst | 198/367 X |
| 2,901,082 | 8/1959 | Baumann | 198/360 X |
| 3,631,979 | 1/1972 | Frankiewicz et al. | 209/655 X |
| 3,776,675 | 12/1973 | Veneria | 209/655 X |
| 4,011,935 | 3/1977 | Massey | 198/369 X |
| 4,555,010 | 11/1985 | Solund | 198/367 X |

FOREIGN PATENT DOCUMENTS

487641 12/1929 Fed. Rep. of Germany ...... 198/366

Primary Examiner—Robert J. Spar
Assistant Examiner—Jennifer L. Doyle
Attorney, Agent, or Firm—Spencer & Frank

[57] ABSTRACT

The device comprises a flat element (9), mounted on a pivot (12) substantially lying in the plane of symmetry of the conveyor belts, and having a stroke that runs from a first lateral sorting position of the carried objects (8), to a second symmetrical position with respect to the pivot, and moreover a set of chutes (7) with convergent axis, placed symmetrically and below on both sides with respect to this pivot, to convey the objects being transported to their respective containers (3), situated below said chutes, said stroke being controlled by a suitable actuator.

7 Claims, 2 Drawing Sheets

SORTING DEVICE FOR CONVEYOR BELT SYSTEMS

BACKGROUND OF THE INVENTION

1. Field of the Invention

This invention refers to a sorting device for conveyor belt systems of the type comprising a plurality of conveyor belt units that can be angularly oscillated from a basically horizontal position, to a downwardly inclined position in the travel direction of the objects being conveyed.

2. Description of the Prior Art

Conveyors of the above mentioned type are used widely in several technical fields. For example in the industial field they are used as distributors in warehouses or as collectors and sorters in assembly lines. Moreover, in post offices they are used to select, sort and forward envelopes, packages, etc.

As it is known, conveyor belts have a fairly simple structure, composed of conveyor belts wound around their respective motorized rollers. By placing several conveyor belts one behind the other, a chain or conveyor belt line is created. Each individual conveyor constitutes what experts in the field refer to as a "sorting unit". So that sorting takes place on one side or the other of a conveyor belt line, several rollers assembled between one band and the other of a unit with axes that are perpendicular to those of the motor rollers that can be either raised or lowered to sort the package in a direction perpendicular to that of the conveyor belt line, have been designed.

An example of a conveyor belt capable of this type of sorting has been described and illustrated by the same applicant in the Italian Pat. No. 1025846 to which reference is made for further details.

Subsequent improvements have made possible conveyor belts capable of transporting and sorting an increasingly larger number of products.

At present the sorting devices designed on the basis of known technology are, generally speaking, efficient and their performance is optimum.

However, should there be a desire to increase the number of outputs, while maintaining a simple structure modification, problems of cost and size arise.

SUMMARY OF THE INVENTION

The main object of this invention is to solve the above mentioned problems and to design a sorting device with a simple and fairly inexpensive structure.

Another object of this invention is to design a device with several outputs, whose overall size is smaller than that obtainable with any other type of known device with the same number of outputs.

A further object of this invention is to design a sorting device that is easy to use when combined with existing conveyor belts.

These objects and others, which will become more apparent hereinafter, are basically attained by using a sorting device for conveyor belts. This device comprises a flat element, mounted on a pivot which has a longitudinal axis that lies substantially in the plane created by an inclined conveyor belts, and the pivot has a stroke that runs from a first lateral sorting position of the carried objects, to a second position which is symmetrical across a vertical plane through the above mentioned pivot. Moreover the device further comprises a set of chutes with convergent axes, placed symmetrically across the vertical plane and below the pivot, to convey the objects being transported to their respective containers. The containers are, situated below the chutes, and the stroke of the flat element is controlled by a suitable actuator means.

BRIEF DESCRIPTION OF THE DRAWINGS

Further features and advantages will be clearer from a description of a preferred, but not exclusive, embodiment of this invention, illustrated by way of an indicative and not limitative example in the enclosed drawings, where.

BRIEF DESCRIPTION OF THE PREFERRED EMBODIMENTS

Figure 1:
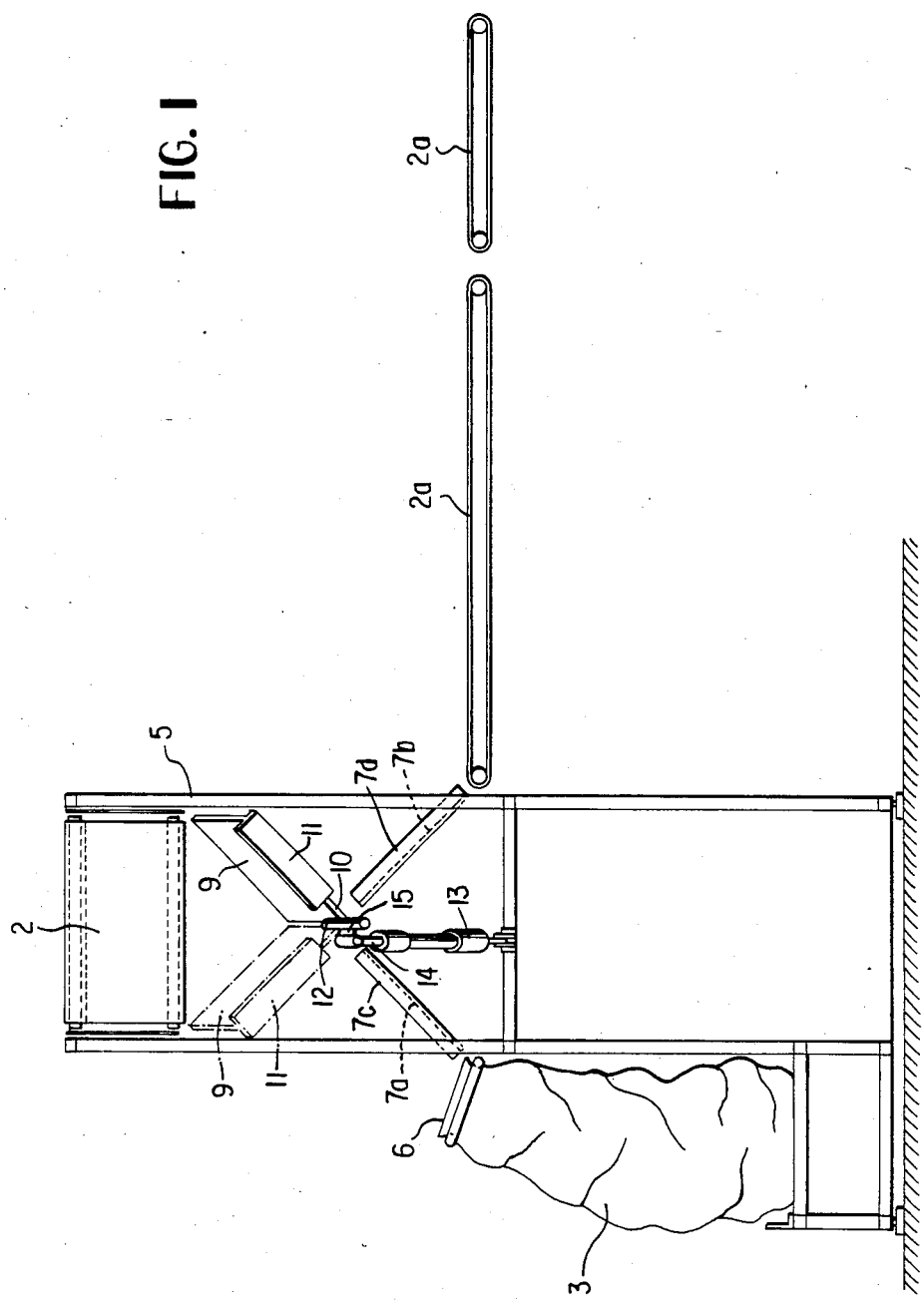
FIG. 1 shows a schematic front elevation view of the sorting device in accordance with this invention.

With reference to the above mentioned figures, and in particular to FIG. 1, reference numeral 1 indicates the whole conveyor belt system.

It is composed, in a fashion known per se, of a number of conveyor belts 2 to which several collecting containers 3 have been laterally added.

The conveyor belts 2 are supported by a frame 5 (FIG. 1) and may angularly oscillate from a basically horizontal position to a downwardly inclined position in the travel direction of the objects being transported.

The containers 3 are provided with an access mouth 6 near to which there are arranged chutes 7a and 7b which are used at the end of the run to facilitate and direct the object 8 to be sorted. Moreover each chute has a respective side containment board 7c and 7d situated in the conveying direction of objects 8.

The actual device consists of a flat element 9 provided with a suitable board 11 running along its own front edge 10, in the travel direction of object 8.

The flat element 9 is rigidly mounted on a pivot 12 which is forwardly inclined with respect to the travel direction of the line by an angle $\alpha 2$ equal to angle $\alpha 1$ which is the maximum angular oscillation direction of conveyor belt 2. A cylinder 13 represents the actuating means that controls transportation of the above mentioned flat element 9 from one position to another.

In fact, the cylinder 13 is constrained at the bottom to a portion of framework 5 and, slidingly engaged therein there is a piston 14 whose rod is hinged to one end of an arm 15, while the other end is rigidly coupled to the pivot 12.

As can be seen from the figures, the pivot 12 lies substantially in the plane created by the belt 2. Having explained the purely structural layout, the functioning of the sorting device will now be described. The objects to be sorted and selected are conveyed by conveyor belts 2, which form a substantially continuous surface, along which the carried objects 8 can proceed without interruption.

When one of these objects has to be inserted in a specific container 3, a conveyor belt 2 is automatically oscillated in a downwards direction. This lowering action causes the object 8 to fall because of gravity.

At this point the piston 14 of cylinder 13, controlled in the right direction, brings about the conveyance of object 8, for example, towards container 3 on side A as shown in the figures. In fact as object 8 fails it bumps against board 11 and then slides onto the plane of chute 7a directed by the relative board 7c to finally land in container 3 on side A. If on the other hand the piston 14 of cylinder 13 is controlled in the other direction, angular displacement of the flat element 9 results in a symmetrical position, across the vertical plane through the pivot, with respect to the previous one, thanks to an articulated system composed of the aforementioned arm 15, enabling object 8 to be conveyed towards container 3 on side B. As it can be seen, the forward inclination of the flat element 9, with respect to the travel direction of the line, determines the 90° rotation of objects 8, ensuring that the objects 8 do however always maintain the frontal position of face 8a, in the travel direction, along the entire run right up to container 3 on side A or B. Moreover, as shown in FIG. 1, object 8 can also be sorted, instead of into a container 3, on one or more belts 2a which allow further sortings. This invention is therefore capable of attaining the proposed goals.

In fact the sorting device herein described is characterized by an extremely simple structure, including reduced dimensions with respect to other known systems with the same number of outputs. This enables a very wide range of sortings to take place.

Figure 2:
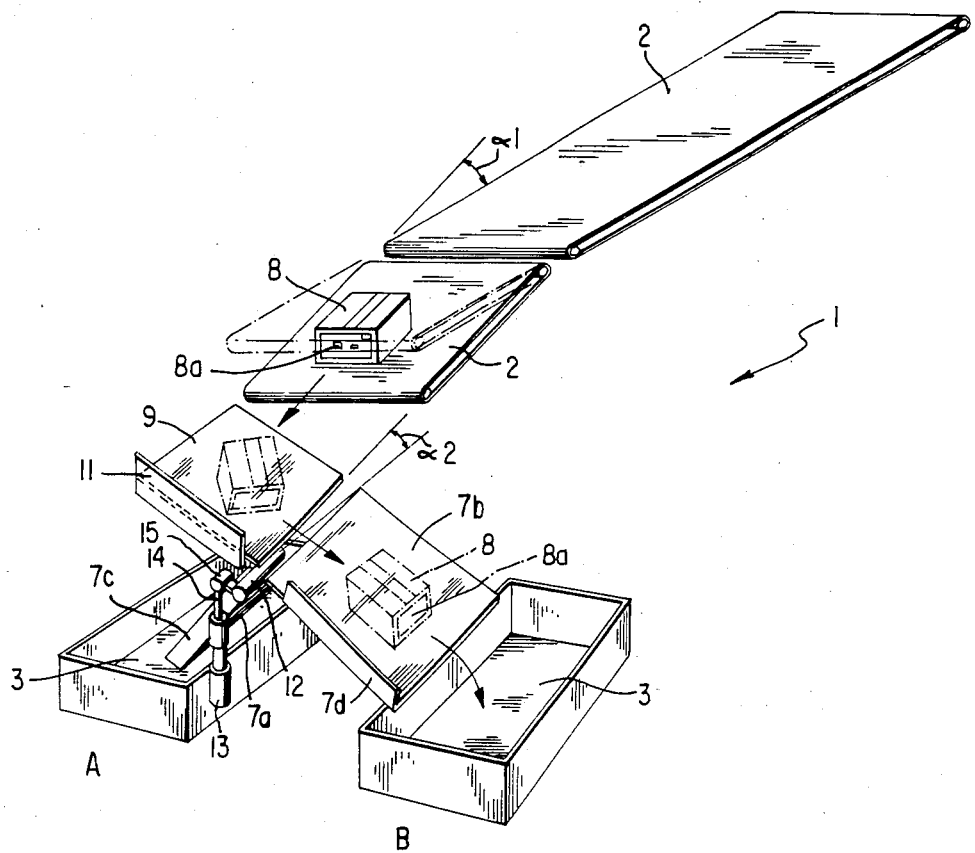
FIG. 2 shows a schematic perspective view of the sorting device in different working positions.

Furthermore, this sorting device is extremely versatile, in that it can easily be applied to other conveyor systems. Thanks to its design, this model can be modified or improved, in line with the inventive concept, and all particulars can be substituted by the equivalent technical elements. In particular the flat element 9 can be made to rock around a center line axis perpendicular to the containment board 11 instead of around the extremity side joined to pivot 12 (FIG. 2), the board 11 only protruding on the upper face of the flat element.

I claim:

1. A sorting device for use with a conveyor belt which transports objects to a delivery end at which the sorting device is located, the device comprising:
   (a) means forming first and second guide surfaces arranged at the delivery end of the conveyor belt, said guide surfaces extending transversely to the direction in which the objects are conveyed and being inclined downwardly towards opposite sides of the conveying direction;
   (b) a generally flat guide element having opposite first and second faces; and
   (c) means for moving said guide element between first and second operative positions, said guide element, when it is in its first position, having its first face inclined downwardly toward one of said sides and being generally in alignment with said first guide surface; said guide element, when it is in its second position, having its second face inclined downwardly toward the other of said sides and being generally in alignment with said second guide surface; said guide element, in each of its operative positions, being located to receive objects as they leave the delivery end of the conveyor belt, in consequence of which objects may be routed via the respective guide surfaces to the opposite sides of the conveying direction depending on which operative position said guide element occupies.

2. A sorting device as defined in claim 1, wherein said moving means comprises a pivot which is turnable about an axis extending generally in the conveying direction, said guide element being mounted on said pivot, for turning movement therewith, between the two operative positions.

3. A sorting device as defined in claim 1, wherein the conveyor belt is angularly movable between a basically horizontal first position and a second position which is downwardly inclined in the travel direction of the objects, said guide element having an axis of rotation that is parallel to the plane formed by the conveyor belt when it is in its second position.

4. A sorting device as defined in claim 1, further comprising:
   a wall arranged along the edge of said guide element which is furthest from the delivery end of the conveyor belt, said wall extending transversely above said first and second faces.

5. A sorting device as defined in claim 2, further comprising:
   a frame means for supporting said device below the conveyor belt and wherein said moving means further comprises:
   a cylinder having one end connected to said frame means;
   a piston rod slidably connected to said cylinder; and
   an arm having a first end hingeably connected to one end of said piston rod and a second end rigidly connected to said pivot, whereby movement of said piston rod causes rotation of said pivot and said guide element.

6. A sorting device as defined in claim 1, wherein each of said guide surfaces further comprises at least one wall arranged along the edge of said guide surface which is furthest from the delivery end of the conveyor belt.

7. A plurality of respective sorting devices disposed adjacent a respective conveyor belt, each of said sorting devices being as defined in claim 1.

* * * * *